United States Patent [19]
Uchiyama et al.

[11] Patent Number: 4,803,616
[45] Date of Patent: Feb. 7, 1989

[54] BUFFER MEMORY

[75] Inventors: Kunio Uchiyama, Hachioji; Tadahiko Nishimukai, Sagamihara; Atsushi Hasegawa, Koganei, all of Japan

[73] Assignees: Hitachi, Ltd.; Hitachi Microcomputer Eng. Ltd., both of Tokyo, Japan

[21] Appl. No.: 781,512

[22] Filed: Sep. 30, 1985

[30] Foreign Application Priority Data

Oct. 1, 1984 [JP] Japan .................. 59-204179

[51] Int. Cl.[4] .................. G06F 13/00; G06F 12/06
[52] U.S. Cl. .................................... 364/200
[58] Field of Search ... 364/200 MS File, 900 MS File

[56] References Cited
U.S. PATENT DOCUMENTS

| 4,332,010 | 5/1982 | Messina et al. | 364/200 |
| 4,349,870 | 9/1982 | Lary | 364/200 |
| 4,363,095 | 12/1982 | Woods et al. | 364/200 |
| 4,400,770 | 8/1983 | Chan et al. | 364/200 |
| 4,410,944 | 10/1983 | Kronies | 364/200 |
| 4,426,682 | 1/1984 | Riffe et al. | 364/200 |
| 4,442,487 | 4/1984 | Fletcher et al. | 364/200 |
| 4,493,026 | 1/1985 | Olnowich | 364/200 |
| 4,580,240 | 4/1986 | Watanabe | 364/900 |
| 4,713,752 | 12/1987 | Tone | 364/200 |
| 4,714,990 | 12/1987 | Desyllas et al. | 364/200 |
| 4,733,350 | 3/1988 | Tone et al. | 364/200 |
| 4,736,287 | 4/1988 | Druke et al. | 364/200 |
| 4,751,638 | 6/1988 | Azuma | 364/200 |
| 4,755,936 | 7/1988 | Stewart et al. | 364/200 |

Primary Examiner—Gareth D. Shaw
Assistant Examiner—Viet Q. Nguyen
Attorney, Agent, or Firm—Antonelli, Terry & Wands

[57] ABSTRACT

In a buffer memory, a validity flag to be added to each data portion is stored in a tag array or address section at a location corresponding to each data portion. After determining whether each validity flag is to be used as a search object, based upon the data portion to be accessed during searching the tag array and an access mode, the address and its validity flag are simultaneously searched. The logical sum of each output of the search result on a word coincidence line becomes a hit judgement signal.

4 Claims, 3 Drawing Sheets

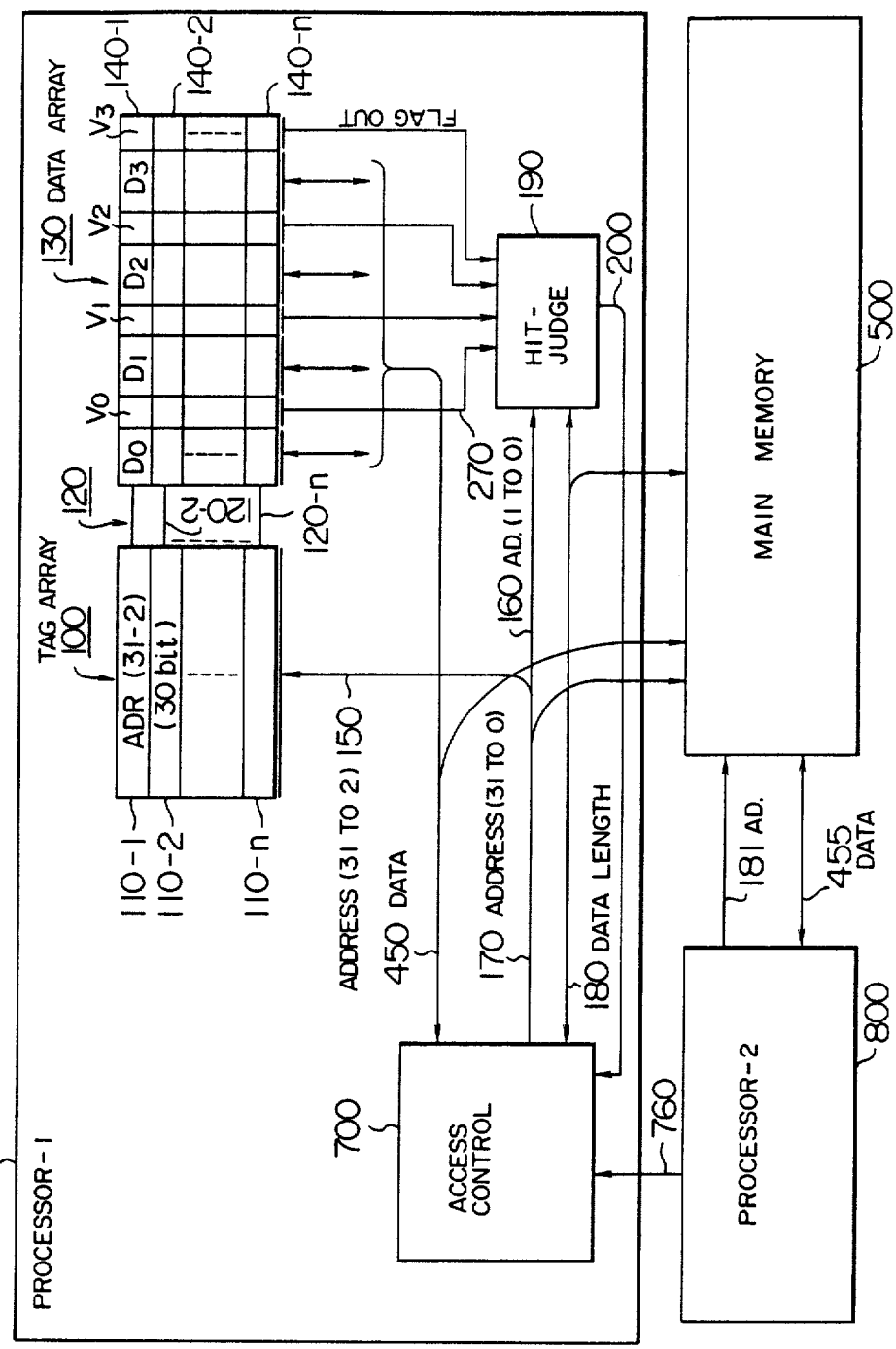
FIG. 1 HIT JUDGEMENT

FIG. 2 OVERHEAD TIME

| ACCESS MODE | ADDRESS bit-0 | bit-1 | DATA LENGTH | M0 | M1 | M2 | M3 |
|---|---|---|---|---|---|---|---|
| READ | 0 | 0 | 1 BYTE | 1 | 0 | 0 | 0 |
|  |  |  | 2 BYTE | 1 | 1 | 0 | 0 |
|  |  |  | 3 BYTE | 1 | 1 | 1 | 0 |
|  |  |  | 4 BYTE | 1 | 1 | 1 | 1 |
|  | 0 | 1 | 1 BYTE | 0 | 1 | 0 | 0 |
|  |  |  | 2 BYTE | 0 | 1 | 1 | 0 |
|  |  |  | 3 BYTE | 0 | 1 | 1 | 1 |
|  | 1 | 0 | 1 BYTE | 0 | 0 | 1 | 0 |
|  |  |  | 2 BYTE | 0 | 0 | 1 | 1 |
|  | 1 | 1 | 1 BYTE | 0 | 0 | 0 | 1 |
| WRITE | φ | φ | φ | 0 | 0 | 0 | 0 |

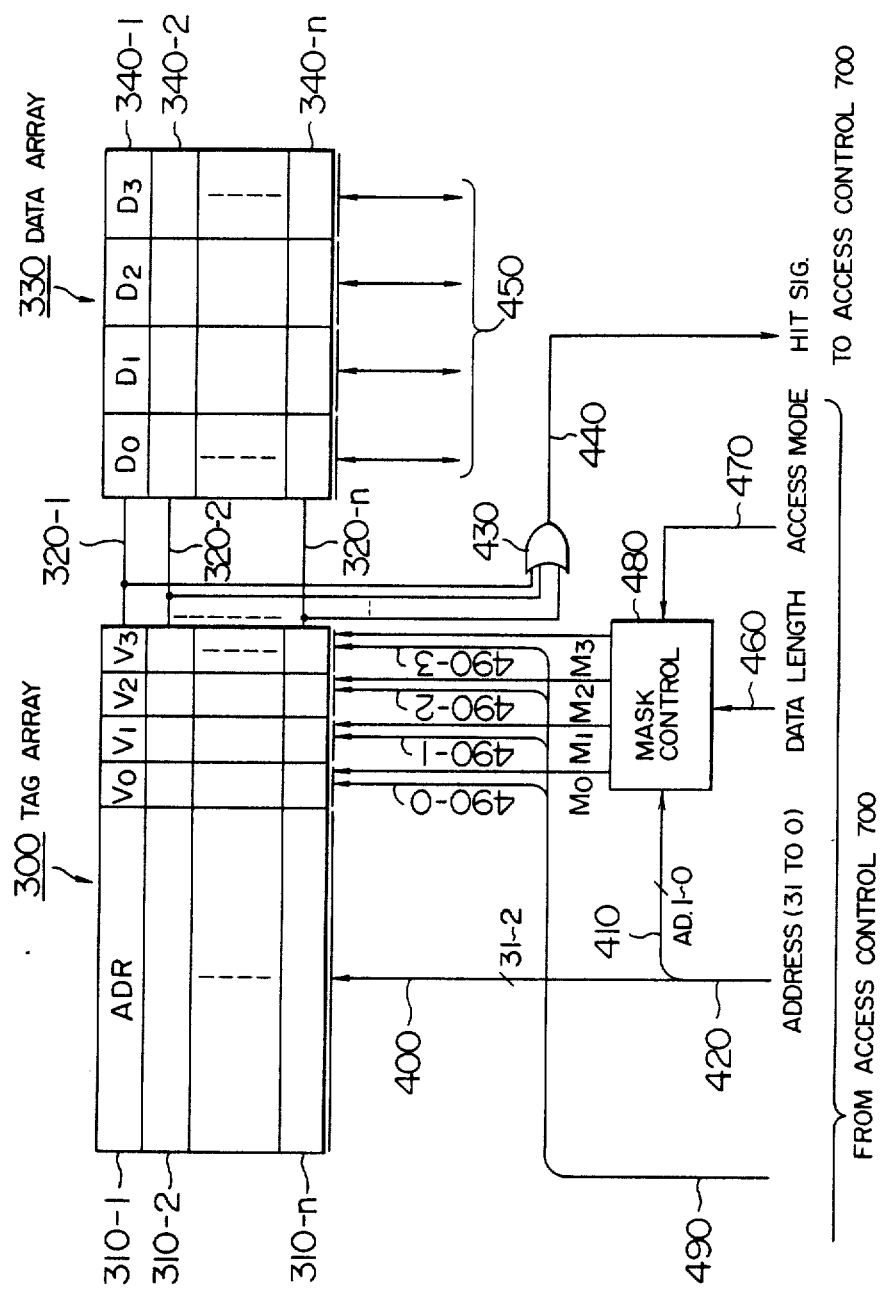

BUFFER MEMORY

BACKGROUND OF THE INVENTION

The present invention relates to a buffer memory or cache memory, and more particularly to a way of judging the presence or absence of necessary data and dealing with the information on validity of the data.

A cache memory of this type has been disclosed in Japanese Unexamined Patent Publications Nos. 58-68286 and 58-68287 laid open in public on Apr. 23, 1983 and claiming a Priority right of West German Patent application filed on Sept. 30, 1981.

A buffer memory or cache memory copies and retains a portion of the contents of a main memory. When a data processing device requests data in the main memory, the buffer memory is first searched. If the data is present in the buffer memory, the data in the buffer memory is used without accessing the main memory. The main memory is accessed only when the data is not present in the buffer memory. In the above operation, a hit judgement, i.e., a judgement whether necessary data is present, i.e., a hit, is made wherein a certain time. In the case of a miss judgement, the activation of an access operation to the main memory is correspondingly delayed so that the processing speed lowers.

According to one of the control methods for a buffer memory, a validity flag is set for each data portion, e.g., each byte in the buffer memory. The validity flag indicates whether the contents of the data portion coincide with the corresponding data in the main memory. For instance, when the contents of some data portion in the main memory are updated for example by writing data in the main memory with an associated device in the system (e.g., I/0 devices) and if the old data which was stored in the corresponding location of the main memory has been copied to the buffer memory, then the contents of the corresponding validity flag are changed to indicate "invalid", i.e., to indicate that there was a renewal of data in the main memory, thus preventing processing of the old data.

With such a method, a check of a validity flag is unavoidable for a hit judgement. It is therefore desirable to shorten the check time for a validity flag so that a hit judgement on the cache memory is conducted at a high speed.

SUMMARY OF THE INVENTION

An object of the present invention is to make the time required for a hit judgement of a buffer memory as short as possible.

Another object of the present invention is to provide a cache memory which can make a hit judgement immediately after the end of searching a tag array, without waiting until the end of reading a data array.

A still further object of the present invention is to provide a buffer memory in which the overhead is reduced if valid data is not present in the buffer memory and thus improving the overall processing speed of a data processing device using buffer memories.

According to the present invention, validity flags for respective data portions are inputted to a tag array of a buffer memory. In searching the tag array, first it is decided based upon the data portion to be searched and an access mode whether the corresponding validity flag is to be considered as a search object or not. Thereafter, the corresponding address and validity flags are searched at the same time to thereby obtain a hit judgement signal directly from the search result outputs, i.e., word coincidence signals. Thus, it is possible to obtain a result of hit judgement without waiting for a data array readout.

BRIEF DESCRIPTION OF THE DRAWINGS

FIG. 1 is a block diagram associated with a buffer memory;

FIG. 2 is a timing chart showing the operation of the device of FIG. 1;

FIG. 3 is a block diagram showing an embodiment of the present invention; and

DESCRIPTION OF THE PREFERRED EMBODIMENT

Figure 4:
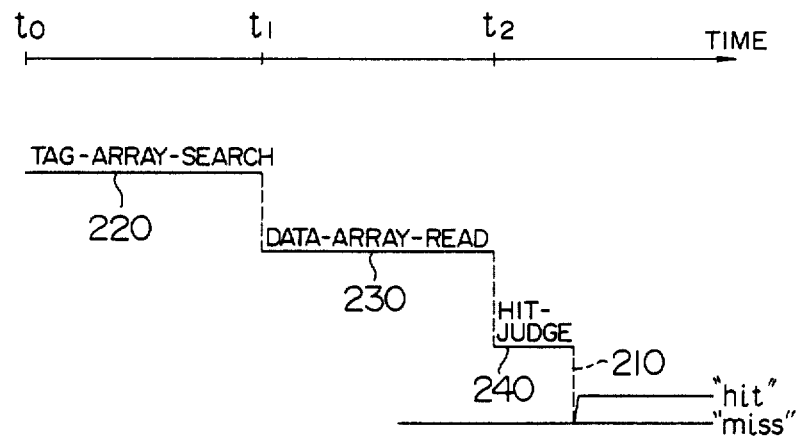
FIG. 4 is an input/output comparison table for the mask control circuit shown in FIG. 3.

FIG. 1 shows the construction of a provisional circuit which ultimately leads to the present invention and has been obtained by an analysis of a conventional cache memory described above and having a function to perform a hit judgement including a validity flag search. A memory including a tag array 100 and a data array 130 constitutes a main part of a buffer memory.

A main memory 500 stores data D0, D1, ... having a byte unit length. The data array 130 in a first processor using the main memory 500 has data storage words 140-1 to 140-$n$ each having data D0 to D3 of 4 byte unit length. Each word 110-1 to 110-$n$ of the tag array has the upper 30 bits of the address (32 bits) at the main memory of the corresponding word 140-1 to 140-$n$ of the data array 130. In this case, if the computer using this cache memory is constructed as a 32 bit machine, the cache memory is preferably constructed as having a 4 byte arrangement. Each word of the data array 130 comprises 4 byte data D0 to D3 and 1 bit validity flags V0 to V3 corresponding to the respective 4 byte data. If the first processor 600 requests data of the main memory 500, access control circuit 700 outputs an address data of 32 bits on an address line 170. The upper 30 bits 150 are supplied as a search input to the tag array 100. At the tag array 100, the coincidence or difference between the 30 bit address data contained in each word and the address data supplied as a search input is checked in parallel for the n words. If there is a coincidence, one of the word coincidence lines 120-1 to 120-$n$ corresponding to the word having a coincidence is activated. In response to the activation, D0 to D3 and V0 to V3 of the corresponding word in the data array 130 are read out, V0 to V3 of which are transferred to a hit judgement circuit 190. The hit judgement circuit 190 checks a validity flag corresponding to the necessary data byte among the 4 byte data, based upon the lower 2 bit address data 160 and data length information 180 respectively sent from the access control circuit 700. After all of the necessary bytes are confirmed as valid, then a hit signal 200 is generated. A validity flag will be cleared if the access control circuit 700 has received a purge signal 760, from a second processor 800 which has updated the content of the main memory, or from an unrepresented peripheral device.

In the above construction, as shown in FIG. 2, three operational steps are needed before completion of a hit judgement 210, that is, a tag array search 220, a data array readout 230 and a hit judgement logical operation 240.

The data array readout time (t1 to t2) is time from when the voltage at the work coincidence line 120 of FIG. 1 is established to when the flag lines 270 are established.

If the number of words (4×n) of the data array 130 becomes great, the number of connection MOS transistors in the data array 130 to be connected to the flag lines 270 also becomes great. The wiring length of each flag line becomes accordingly long, so that the establishment of a hit signal on the hit signal line 200 by the hit judgement circuit 190 is delayed.

FIG. 3 shows an embodiment of a circuit diagram associated with hit judgement according to the present invention, wherein the access control circuit 700 is for simplicity of description. A memory constructed of a tag array 300 and a data array 330 constitutes a main part of a buffer memory. The data array 330 is constructed of words 340-1 to 340-n each copying and storing a data block of 4 bytes (D0 to D3) from a main memory. The tag array 300 is constructed of words 310-1 to 310-n (for example, n = 64), each of the words storing the upper 30 bits of the address data (32 bits) of the corresponding data array word and one-bit validity flags V0 to V3 corresponding to each byte D0 to D3. It is noted that the address is allocated for each byte and a validity flag "1" indicates valid, while "0" indicates invalid. The search result of each word of the tag array appears as a signal on a corresponding one of word coincidence lines 320-1 to 320-n, wherein "1" represents a success of search (or coincidence between the search input and the word contents), while "0" represents a failure.

A signal line 420 is supplied with address data (32 bits) for access of the main memory, the upper 30 bits 400 thereof being transferred to the tag array 300 as an search input while the lower 2 bits are transferred to a mask control circuit 480. The mask control circuit 480 also receives the length (the number of bytes) of the data to be accessed and an access mode (read or write) command 470. Based upon received input information, mask signals M0 to M3 are generated which indicate whether the respective validity flags V0 to V3 in the tag array are used as search objects. The mask signals M0 to M3 correspond respectively to the validity flags V0 to V3, wherein "1" indicates that the corresponding validity flag is to be used as a search object while "0" indicates that the corresponding validity flag is not used as a search object. Data to be accessed is here identified by the address of the lowest byte and the number of bytes or data length. The mask signals M0 to M3 take the values as shown in FIG. 4 in accordance with the combination of the lower 2 bits 410 of the address, data length 460 and access mode 470. In FIG. 4 "$\phi$" indicates that the values have no connection with the operation.

Referring back to FIG. 3, signals 490-0 to 490-3 are search inputs relative to the validity flags V0 to V3 of the tag array 300, the signal always taking "1" when a search is needed. The signal 490 becomes an effective search input when the corresponding mask signal M0 to M3 is "1", while on the other hand it does not act as a search input at "0". If any one of the mask signals M0 to M3 is "0", then the validity flag at the position corresponding to this mask signal is excluded from a search object to be subjected to coincidence comparison.

An OR gate 430 functions as a hit judgement circuit and generates a hit judgement signal 440 upon reception of any one of the signals from word coincidence lines 320-1 to 320-n.

The time from when the voltage of a signal on the word coincidence line is established to when the hit judgement signal 440 is established becomes very short. The reason is that a hit judgement signal can be obtained by merely inputting a word coincidence signal to the OR circuit 430 and the afore-mentioned data array readout time is avoided which depends on the number of words n of the cache memory. If any one of the word coincidence lines becomes "1", the hit judgement signal 440 becomes "1" to indicate the presence of the requested data. Signals 450 represent the input/output data of the data array 330.

Next, the operation will be described. First, in case of data readout, the access control circuit of the first processor 600, without conducting a fetch activation to the main memory, starts operating to check whether the data to be read is present in the buffer memory. To this end, 32 bit address data 420 and a data length 460 are supplied from the access control circuit 700, and the access mode 470 shows a read mode. The mask control circuit 480 generates the mask signals M0 to M3 in conformity with FIG. 4 to indicate which validity flags V0 to V3 become search objects. The tag array 300 conducts a search in connection with the validity flags designated as search objects and the upper 30 bits of the address. The search result immediately appears as a hit judgement signal 440 through the word coincidence lines 320-1 to 320-n and the OR gate 430.

If the hit judgement signal 440 is a "hit" or "1", this means that the requested data is present in the data array 330 and also that it is valid. Therefore, instead of commanding a fetch activation to the main memory, an output signal 450 from the data array word corresponding to the tag array word which has been decided to have a coincidence at the search, is transferred to the access control circuit.

If the hit judgement signal 440 is "missed" or "0", this means that either the data at the designated address is not present or it is invalid even if it is present. Therefore, the access control circuit commands a fetch activation to the main memory 500 to read the requested data. It is to be appreciated that in the present invention the result of hit judgement is obtained prior to the readout of the data array 330.

Data read out from the main memory is used not only as an object of operation in the data processing device, but also the data is written in the data array 330. To this end, the access mode is changed to a write mode and the tag array 300 is again searched for decision of a storage location of the data. In this case, the address data 420 is retained to have the same address as in the previous search. It is noted that a write access mode is effected upon readout operation of the main memory. All of the mask signals M0 to M3 however become "0" in the write access mode as shown in FIG. 4, so that the validity flags V0 to V3 are excluded from search objects. In other words, only the values of the address are searched. If a word having a coincidence is detected during such a search, 4 byte data read out from the main memory is written in the corresponding data array word location, and simultaneously therewith the corresponding validity flags for the 4 bytes are set at "1". If on the other hand a word having a coincidence is not detected during such a search, one of the vacant word locations is selected as well known in accordance with a predetermined rule. The data read out from the main memory is written in the data array 330 at the selected word, its address is written in the tag array 300, and the validity flags are set.

Next, the write operation of data to the main memory will be described.

If data has been stored in the main memory, the access mode 470 indicates a write mode and the mask control circuit 480 is supplied with address data 420 and a data length 460. As shown in the bottom line of FIG. 4, the signals M0 to M3 are not activated in the write access mode and the validity flags V0 to V3 are not searched.

Only the addresses in the tag array 300 are searched. In the presence of a word having a coincidence, the same data stored in the main memory is written in the corresponding data array word. In the absence of a word having a coincidence, one of the vacant locations is selected, where the data, address and validity bits are written. These operations are substantially the same as those operations wherein the data read out from the main memory is written when requested data is not present in the data array. Whether the actual writing operation to the main memory is conducted in parallel with the above operation or at other timings varies in accordance with a buffer memory control method. This however is not directly related to the gist of the present invention.

Although the logical sum circuit 430 of FIG. 3 employs an OR circuit using positive logic signals, an AND circuit using negative logic signals may be replaced therewith.

In the foregoing description, although a buffer memory constructed by using a 32 bit address, a lower 2 bit address and 64 stages of 4 byte data has been employed, other bit arrangements, such as using a 64 or 16 bit address, the lower 3 bit address and 8 byte data are also applicable.

We claim:

1. A buffer memory system comprising:
   (1) a data array having a plurality of word lines, and means for storing a plurality of data blocks on each of said plurality of word lines;
   (2) a tag array having a plurality of word coincidence lines each of which is connected to a respective one of said plurality of word lines of said data array, said tag array having a first area which stores upper bits of address data of one of a plurality of data blocks in a main memory, said first area having first means for selecting one of said plurality of word coincidence lines so as to read out at least one of said plurality of data blocks from one of said plurality of word lines corresponding to said selected one of said plurality of word coincidence lines, and said tag array having a second area which stores a plurality of validity flags along each of said plurality of word coincidence lines, each of said plurality of validity flags along each respective one of said plurality of word coincidence lines corresponding to a respective one of said plurality of data blocks along the respective word line of said data array and means for searching the first and second areas to detect coincidence between said stored upper bits and an address signal supplied as a search input;
   (3) mask control means responsive to lower bits of said address signal as well as to a data length signal indicating the length of data blocks to be read out from said array for generating a plurality of mask signals, each mask signal indicating whether a corresponding validity flag in each word coincidence line is to be used or not used as a search object by said searching means, said plurality of mask signals being supplied to said second area of said tag array to mask said validity flags selectively; and
   (4) hit judgement means having a plurality of inputs which are connected to said plurality of word coincidence lines of said tag array, said hit judgement means including means for generating a hit signal indicating that a requested data is present in said data array when coincidence is detected by said searching means.

2. A buffer memory according to claim 1, wherein said hit judgement circuit includes a circuit for obtaining a logical sum of each on said plurality of word coincidence lines.

3. A processor including a buffer memory system, said buffer memory system comprising:
   (1) a data array having a plurality of word lines, and means for storing a plurality of data blocks on each of said plurality of word lines;
   (2) a tag array having a plurality of word coincidence lines each of which is connected to a respective one of said plurality of word lines of said data array, said tag array having a first area which stores upper bits of address data of one of a plurality of data blocks in a main memory, said first area having first means for selecting one of said plurality of word coincidence lines so as to read out at least one of said plurality of data blocks from one of said plurality of word lines corresponding to said selected one of said plurality of word coincidence lines, and said tag array having a second area which stores a plurality of validity flags along each of said plurality of word coincidence lines, each of said plurality of validity flags along each respective one of said plurality of word coincidence lines corresponding to a respective one of said plurality of data blocks along the respective word line of said data array and means for searching the first and second areas to detect coincidence between said stored upper bits and an address signal supplied as a search input;
   (3) mask control means responsive to lower bits of said address signal as well as to a data length signal indicating the length of data blocks to be read out from said data array for generating a plurality of mask signals, each mask signal indicating whether a corresponding validity flag in each word coincidence line is to be used or not used as a search object by said searching means, said plurality of mask signals being supplied to said second area of said tag array to mask said validity flags selectively; and
   (4) hit judgement means having a plurality of inputs which are connected to said plurality of word coincidence lines of said tag array, said hit judgement means including means for generating a hit signal indicating that a requested data is present in said data array when coincidence is detected by said searching means.

4. A processor according to claim 3, wherein said hit judgement circuit includes a circuit for obtaining a logical sum of each on said plurality of word coincidence lines.

* * * * *